United States Patent
Trachte et al.

(10) Patent No.: US 11,858,511 B2
(45) Date of Patent: Jan. 2, 2024

(54) CONTROL SYSTEM FOR A MOTOR VEHICLE AND METHOD FOR ADAPTING THE CONTROL SYSTEM

(71) Applicant: Robert Bosch GmbH, Stuttgart (DE)

(72) Inventors: Adrian Trachte, Stuttgart (DE);
Benedikt Alt, Heimsheim (DE);
Carolina Passenberg, Rutesheim (DE);
Michael Herman, Sindelfingen (DE);
Michael Hilsch, Gaertringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 376 days.

(21) Appl. No.: 17/069,093

(22) Filed: Oct. 13, 2020

(65) Prior Publication Data
US 2021/0114593 A1   Apr. 22, 2021

(30) Foreign Application Priority Data
Oct. 21, 2019   (DE) .......................... 102019216150.2

(51) Int. Cl.
*B60W 30/14*   (2006.01)
*B60W 50/14*   (2020.01)
(Continued)

(52) U.S. Cl.
CPC ............ *B60W 30/14* (2013.01); *B60W 50/14* (2013.01); *G06N 20/00* (2019.01);
(Continued)

(58) Field of Classification Search
CPC ................ B60W 30/14; B60W 50/14; B60W 2050/0011; B60W 2050/0028;
(Continued)

(56) References Cited

U.S. PATENT DOCUMENTS 9,165,477 B2 * 10/2015 Wilson .................. B60W 50/12
2018/0164810 A1 * 6/2018 Luo ....................... G05D 1/0223
(Continued)

FOREIGN PATENT DOCUMENTS

DE   102011100277 A1   11/2012
DE   102013210941 A1   12/2014
(Continued)

*Primary Examiner* — Geepy Pe
*Assistant Examiner* — Kimia Kohankhaki
(74) *Attorney, Agent, or Firm* — NORTON ROSE FULBRIGHT US LLP; Gerard Messina

(57) ABSTRACT

A control system for a motor vehicle, for outputting a controlled variable, with the aid of which a directly controlled variable of a motor vehicle is adjustable via suitable control operations, in order to adapt the directly controlled variable to a reference variable of the control system. The control system includes a controller, which is configured to output a first output variable on the basis of the directly controlled variable of the motor vehicle, and on the basis of the reference variable of the control system. The control system further includes a predictive model, which may be trained to output a second output variable that reflects a deviation of a driving behavior of a driver of the motor vehicle from the first output variable of the controller. The controlled variable of the control system encompasses an addition of the first output variable and the second output variable.

22 Claims, 3 Drawing Sheets

(51) Int. Cl.
  *G06N 20/00* (2019.01)
  *B60W 50/00* (2006.01)
(52) U.S. Cl.
  CPC .............. *B60W 2050/0011* (2013.01); *B60W 2050/0028* (2013.01); *B60W 2050/0088* (2013.01); *B60W 2540/10* (2013.01); *B60W 2540/12* (2013.01); *B60W 2540/18* (2013.01); *B60W 2540/30* (2013.01); *B60W 2554/80* (2020.02)
(58) Field of Classification Search
  CPC ..... B60W 2050/0088; B60W 2540/10; B60W 2540/12; B60W 2540/18; B60W 2540/30; B60W 2554/80; B60W 40/08; G06N 20/00; G06N 3/063; G06N 3/08
  See application file for complete search history.

(56) References Cited

U.S. PATENT DOCUMENTS

2019/0187706 A1* 6/2019 Zhou ................ G06N 20/00
2020/0379461 A1* 12/2020 Singh ............... G06N 3/044

FOREIGN PATENT DOCUMENTS

DE    102015016993 A1    6/2017
DE    102019110759 A1    11/2019

* cited by examiner

CONTROL SYSTEM FOR A MOTOR VEHICLE AND METHOD FOR ADAPTING THE CONTROL SYSTEM

CROSS REFERENCE

The present application claims the benefit under 35 U.S.C. § 119 of German Patent Application No. DE 102019216150.2 filed on Oct. 21, 2019, which is expressly incorporated herein by reference in its entirety.

FIELD

The present invention relates to a control system for a motor vehicle, for outputting a controlled variable, with the aid of which a directly controlled variable of a motor vehicle is adjustable via suitable control operations, in order to adapt the directly controlled variable to a reference variable of the control system.

BACKGROUND INFORMATION

Control systems are used, for example, as a driving assistance system in a motor vehicle, in order to assist and/or relieve the stress on the driver in certain driving situations.

For the implementation of these assistance functions, a driver assistance system includes surround sensors, such as radar sensors, lidar sensors, laser scanners, video sensors and ultrasonic sensors. If a vehicle is equipped with a navigation system, then the driver assistance system also accesses data of this system. In addition, the driver assistance system connected to the electrical system of the vehicle by preferably at least one bus, preferably, the CAN bus, may also actively intervene in on-board systems, such as, in particular, the steering system, the brake system, the power train and warning systems.

In the case of the available control systems within a vehicle fleet, a uniform calibration of the control system is normally utilized. At best, the control system may just be adapted to a sport mode or a comfort mode. Up to now, individual adaptation to the driving behavior of an individual driver has not been known.

Therefore, it would be desirable to provide a control system, which allows such individual adaptation to the driving behavior of an individual driver.

SUMMARY

This may be achieved by a control system and a method according to example embodiments of the present invention.

Preferred specific embodiments of the present invention provide a control system for a motor vehicle, for outputting a controlled variable, with the aid of which a directly controlled variable of a motor vehicle is adjustable via suitable control operations, in order to adapt the directly controlled variable to a reference variable of the control system; the control system including a controller, which is configured to output a first output variable on the basis of the directly controlled variable of the motor vehicle and on the basis of the reference variable of the control system; and further including a predictive model, which may be trained to output a second output variable that reflects a deviation of a driving behavior of a driver of the motor vehicle from the first output variable of the controller; the controlled variable of the control system encompassing an addition of the first output variable and the second output variable.

The controller of the control system includes, for example, a conventional control algorithm, for example a PID-type controller. In order to adapt the control system to a driving behavior of an individual driver, it is provided that with the aid of a predictive model, the difference of the driving behavior from the current controller be modeled, and that the control system be adapted to the driving behavior of an individual driver, by adding the second output variable of the predictive model, which reflects the deviation of a driving behavior of a driver of the motor vehicle from the first output variable of the controller, to the first output variable of the controller.

The control system is, for example, a driving assistance system, which may be used in a motor vehicle, in order to assist and/or relieve the stress on the driver in certain driving situations, for example, for regulating the distance from a reference object, in particular, a ranging assistance system or a parking assistance system or an assistance system for integrating a vehicle driving at least partially autonomously into a flow of traffic.

To control spacing, a distance of the motor vehicle from the reference object is normally adapted to a desired setpoint value, that is, to the reference variable of the control system, using suitable control operations, such as acceleration and/or braking and/or steering actions. By adjusting the controlled variable to the driving behavior of an individual driver, the control operations may be adjusted to the driving behavior, as well. This advantageously increases the acceptance of such systems.

In one further preferred specific embodiment of the present invention, the directly controlled variable of the motor vehicle reflects a distance of the motor vehicle from a reference object in a surrounding area of the motor vehicle.

The reference object in the surrounding area of the motor vehicle is, for example, a third motor vehicle, in particular, one driving ahead, a pedestrian, an animal or another road user. Alternatively, the reference object may also be a stationary object in the surrounding area, for example, a guardrail, a tree, a pole, a building, or the like. In the same way, a road marking, such as a lane boundary, broken white line, or the like, may also be understood as a reference object, as well.

In one further preferred specific embodiment of the present invention, the controller includes a conventional type of controller, in particular, a PID-type controller, and/or the predictive model includes a Gaussian process model or a neural network.

In a further preferred specific embodiment of the present invention, the predictive model may be trained to output the second output variable as a function of at least one input variable; an input variable including one of the following variables: reference variable of the control system, directly controlled variable of the motor vehicle, a variable that represents operating data of the motor vehicle and/or surrounding-area data of the motor vehicle. The reference variable of the control system is the desired setpoint value, to which the directly controlled variable is intended to be adapted. Operating data of the motor vehicle include, for example, speed, acceleration, steering angle, inclination. Surrounding-area data of the motor vehicle include, for example, information about the road condition, weather, grade of the road, course of the road, etc. By utilizing the above-mentioned variables as input variables for the predictive model, the second output variable may be outputted advantageously as a function of these variables.

Further preferred specific embodiments of the present invention relate to a computer-implemented method of training a predictive model for a control system for a motor vehicle in accordance with the specific embodiments; a first training phase including: in a deactivated state of the control system, ascertaining a deviation of a driving behavior of a driver of the motor vehicle from a first output variable of a controller of the control system; and training the predictive model, using the ascertained deviation of the driving behavior.

A deactivated state of the control system is understood to mean that the control system is not used for controlling a driving assistance function, but that the driver of the motor vehicle controls this.

In further preferred specific embodiments of the present invention, the first training phase additionally includes: ascertaining the driving behavior of the driver as a function of the directly controlled variable of the motor vehicle, and computing the first output variable of the controller. In light of the computed, first output variable of the controller and the ascertained driving behavior with a control system deactivated, the deviation of the driving behavior from the first output variable of the controller may be ascertained. The predictive model is advantageously trained, using the ascertained deviation of the driving behavior as a function of the directly controlled variable of the motor vehicle.

In further preferred specific embodiments of the present invention, the ascertaining of the driving behavior includes the ascertaining of at least one variable, which represents an accelerator pedal action and/or a braking action and/or a steering action.

In further preferred specific embodiments of the present invention, the training takes place as a function of at least one further variable, which represents operating data of the motor vehicle and/or surrounding-area data of the motor vehicle. Operating data of the motor vehicle include, for example, speed, acceleration, steering angle, inclination. Surrounding-area data of the motor vehicle include, for example, information about the road condition, weather, grade of the road, course of the road, etc.

In one further preferred specific embodiment of the present invention, a second training phase of the method includes: optimizing the predictive model as a function of at least one further variable, which is associated with a reference object in a surrounding area of the motor vehicle. The reference object is, for example, a third vehicle, in particular, one driving ahead. By optimizing the predictive model with regard to the reference object, the predictive model may be optimized advantageously with regard to a future position of the reference object.

In one further preferred specific embodiment of the present invention, the optimizing of the predictive model further includes: ascertaining a state of the motor vehicle at one time, including at least one variable, which is associated with the motor vehicle; ascertaining a state of the reference object at this time, including at least one variable, which is associated with the reference object; and ascertaining a distribution over future states and identifying at least one model parameter, which minimizes the expected value of an error in the distribution over the future states. $x_t^{own}$ is the state of the motor vehicle at one time, $x_t^{lead}$ is the state of the reference object at this time t. The distribution over future states is then given by.

$$p(x_{t+1}^{own}, x_{t+1}^{lead}, x_{t+2}^{own}, x_{t+2}^{lead}, \ldots | x_t^{own}, x_t^{lead}, \theta)$$

An error at time t+5 is given by $L(x_{t+\delta}^{own}, x_{t+\delta}^{lead})$. A model parameter, which minimizes the expected value of the error, solves the following optimization problem:

$$\theta = \operatorname{argmin}_\theta \mathbb{E}\left[\Sigma_{\delta=1}^{T_{max}} L(x_{t+\delta}^{own}, x_{t+\delta}^{lead}) | p(x_{t+1}^{own}, x_{t+1}^{lead}, x_{t+2}^{own}, x_{t+2}^{lead}, \ldots | x_t^{own}, x_t^{lead}, \theta)\right],$$

where $T_{max}$ describes the maximum prediction horizon. The identified model parameter minimizes the accumulated error of time step $T_{max}$. The minimization of the long-term error is particularly advantageous, in order to prevent long-term accumulating prediction errors.

In one further preferred specific embodiment of the present invention, a third training phase of the method includes: in the activated state of the control system, testing the predictive model in comparison with an action of the driver. The action of the driver may provide data about whether and/or how effectively the control system is still able to reflect the driving behavior of the driver.

In one further preferred specific embodiment of the present invention, the first and/or the second training phase are repeated, and/or further steps, in particular, deactivation of the control system and/or outputting of a warning, are executed as a function of the testing of the predictive model.

Further preferred specific embodiments of the present invention relate to a computer program, which is configured to execute the steps of a method according to the specific embodiments.

Further preferred specific embodiments of the present invention relate to a machine-readable storage medium, in which the computer program according to the specific embodiments is stored.

Further preferred specific embodiments of the present invention relate to a control unit, which is configured to execute the steps of a method according to the specific embodiments.

Further preferred specific embodiments of the present invention relate to use of a control system according to the specific embodiments, and/or of a predictive model that is trained by a method according to the specific embodiments, and/or of a method according to the specific embodiments, and/or of a computer program according to the specific embodiments, and/or of a machine-readable storage medium according to the specific embodiments, and/or of a control unit according to the specific embodiments, for adapting a control system for a motor vehicle to an individual driving behavior of a driver.

Further preferred specific embodiments of the present invention relate to use of a control system according to the specific embodiments, and/or of a predictive model that is trained by a method according to the specific embodiments, and/or of a method according to the specific embodiments, and/or of a computer program according to the specific embodiments, and/or of a machine-readable storage medium according to the specific embodiments, and/or of a control unit according to the specific embodiments, in a driving assistance system of a motor vehicle, in particular, for adaptive cruise control (ACC).

Additional features, uses and advantages of the present invention are derived from the description herein of exemplary embodiments of the present invention, which are illustrated in the figures. In this context, all of the described or illustrated features form the subject matter of the present invention, either alone or in any combination, irrespective of their wording and representation in the description herein and in the figures.

DETAILED DESCRIPTION OF EXAMPLE EMBODIMENTS

Figure 1:
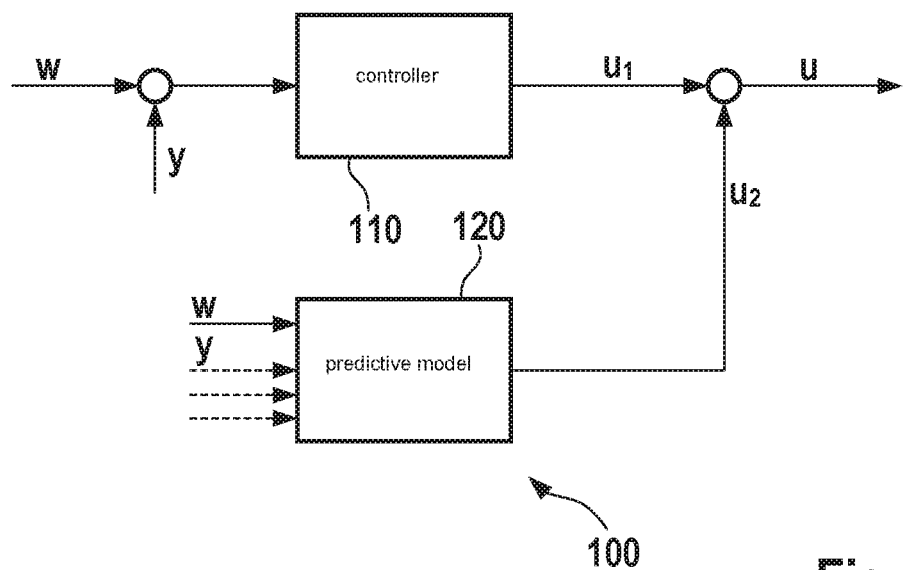
FIG. 1 shows a schematic representation of a control system for a motor vehicle in accordance with an example embodiment of the present invention.

FIG. 1 schematically shows a control system 100 for a motor vehicle (not shown), for outputting a controlled variable u, with the aid of which a directly controlled variable y of a motor vehicle is adjustable via suitable control operations, in order to adapt directly controlled variable y to a reference variable w of the control system.

To implement these control operations, the control system is preferably connected to an electrical system of the motor vehicle, using, preferably, at least one bus, preferably, the CAN bus (not shown), so that by actively intervening in on-board systems, such as, in particular, a steering system, brake system, power train and warning systems, directly controlled variable y may be adapted to a reference variable w of the control system.

The control system includes a controller 110, which is configured to output a first output variable u1 on the basis of directly controlled variable y of the motor vehicle, and on the basis of reference variable w of the control system. Controller 110 of control system 100 includes, for example, a conventional control algorithm, for example, a PID-type controller.

Control system 100 further includes a predictive model 120, which may be trained to output a second output variable u2 that reflects a deviation of a driving behavior of a driver of the motor vehicle from first output variable u1 of the controller. According to the specific embodiment shown, controlled variable u of control system 100 encompasses an addition of first output variable u1 and second output variable u2.

In order to adapt control system 100 to the driving behavior of an individual driver, then, with the aid of predictive model 120, the difference of the driving behavior from current controller 110 is modeled, and control system 100 is adapted to the driving behavior of an individual driver, by adding second output variable u2 of predictive model 120, which reflects the deviation of the driving behavior of a driver of the motor vehicle from first output variable u1 of controller 110, to first output variable u1 of controller 110.

Control system 100 is, for example, a driving assistance system, which may be used in a motor vehicle, in order to assist and/or relieve the stress on the driver in certain driving situations, for example, for regulating the distance from a reference object, in particular, a ranging assistance system or a parking assistance system or an assistance system for integrating a vehicle driving at least partially autonomously into a flow of traffic.

To control spacing, a distance of the motor vehicle from the reference object is normally adapted to a desired setpoint value, that is, to the reference variable of the control system, using suitable control operations, such as acceleration and/or braking and/or steering actions. By adjusting the controlled variable to the driving behavior of an individual driver, the control operations may be adjusted to the driving behavior, as well. This advantageously increases the acceptance of such systems.

In one further preferred specific embodiment of the present invention, the directly controlled variable of the motor vehicle reflects a distance of the motor vehicle from a reference object in a surrounding area of the motor vehicle.

The reference object in the surrounding area of the motor vehicle is, for example, a third motor vehicle, in particular, one driving ahead, a pedestrian, an animal or another road user. Alternatively, the reference object may also be a stationary object in the surrounding area, for example, a guardrail, a tree, a pole, a building, or the like. In the same way, a road marking, such as a lane boundary, broken white line, or the like, may also be understood as a reference object, as well.

In order to measure the distance of the motor vehicle from the reference object, the motor vehicle preferably includes surround sensors (not shown), such as radar sensors, lidar sensors, laser scanners, video sensors and ultrasonic sensors. If the motor vehicle is equipped with a navigation system, then data of this system may also be accessed.

In one further preferred specific embodiment of the present invention, controller 110 includes a conventional type of controller, in particular, a PID-type controller, and/or predictive model 120 includes a Gaussian process model or a neural network.

In a further preferred specific embodiment of the present invention, predictive model 120 may be trained to output second output variable u2 as a function of at least one input variable; an input variable including one of the following variables: reference variable w of the control system, directly controlled variable y of the motor vehicle, a variable that represents operating data of the motor vehicle and/or surrounding-area data of the motor vehicle. Reference variable w of control system 100 is the desired setpoint value, to which directly controlled variable y is intended to be adapted. Operating data of the motor vehicle include, for example, speed, acceleration, steering angle, inclination. Surrounding-area data of the motor vehicle include, for example, information about the road condition, weather, grade of the road, course of the road, etc. By utilizing the above-mentioned variables as input variables for predictive model 120, second output variable u2 may be outputted advantageously as a function of these variables. These variables are advantageously measured by suitable sensors, such as surround sensors, and/or provided to the control system by suitable devices for transmitting data.

Figure 2:
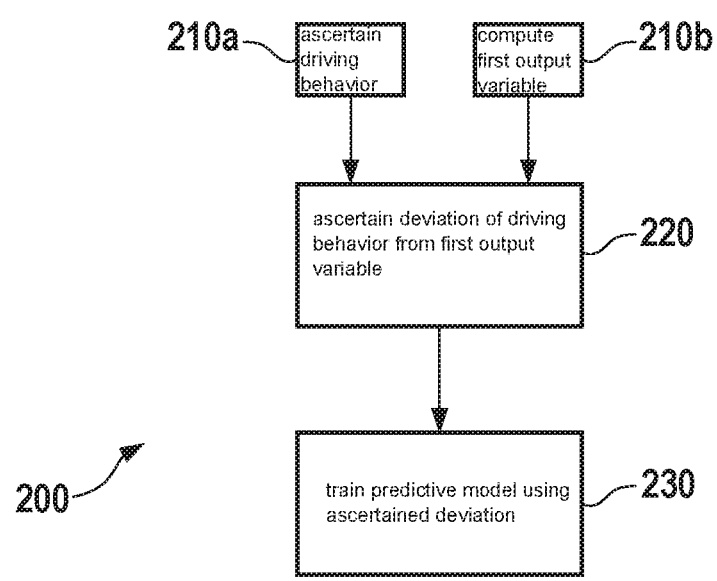
FIG. 2 shows a schematic representation of steps of a first training phase of a computer-implemented method for training a predictive model in accordance with an example embodiment of the present invention.

FIG. 2 schematically shows steps of a first training phase of a computer-implemented method 200 for training a predictive model 120 for a control system 100 for a motor vehicle, according to the specific embodiments of the present invention; the first training phase including the following steps: in a deactivated state of control system 100, ascertaining 220 a deviation of a driving behavior of a driver of the motor vehicle from first output variable u1 of controller 110 of control system 100; and training 230 predictive model 120, using the ascertained deviation of the driving behavior.

A deactivated state of control system 100 is understood to mean that control system 100 is not used for controlling a driving assistance function, but that the driver of the motor vehicle controls this.

In further preferred specific embodiments of the present invention, the first training phase of method 200 further includes the following steps: ascertaining 210a the driving behavior of the driver as a function of directly controlled variable y of the motor vehicle; and computing 210b first output variable u1 of controller 110. In light of computed, first output variable u1 of controller 110 and the ascertained driving behavior with a deactivated control system 100, the deviation of the driving behavior from first output variable u1 of the controller may be ascertained. Predictive model 120 is advantageously trained, using the ascertained deviation of the driving behavior as a function of directly controlled variable y of the motor vehicle.

In further preferred specific embodiments of the present invention, the ascertaining 210a of the driving behavior includes the ascertaining of at least one variable, which represents an accelerator pedal action and/or a braking action and/or a steering action.

In further preferred specific embodiments of the present invention, the training of predictive model 120 takes place as a function of at least one further variable, which represents operating data of the motor vehicle and/or surrounding-area data of the motor vehicle. Operating data of the motor vehicle include, for example, speed, acceleration, steering angle, inclination. Surrounding-area data of the motor vehicle include, for example, information about the road condition, weather, grade of the road, course of the road, etc.

In one further preferred specific embodiment of the present invention, a second training phase of the method includes: optimizing the predictive model as a function of at least one further variable, which is associated with a reference object in a surrounding area of the motor vehicle. The reference object is, for example, a third vehicle, in particular, one driving ahead. By optimizing predictive model 120 with regard to the reference object, predictive model 120 may be optimized advantageously with regard to a future position of the reference object.

Figure 3:
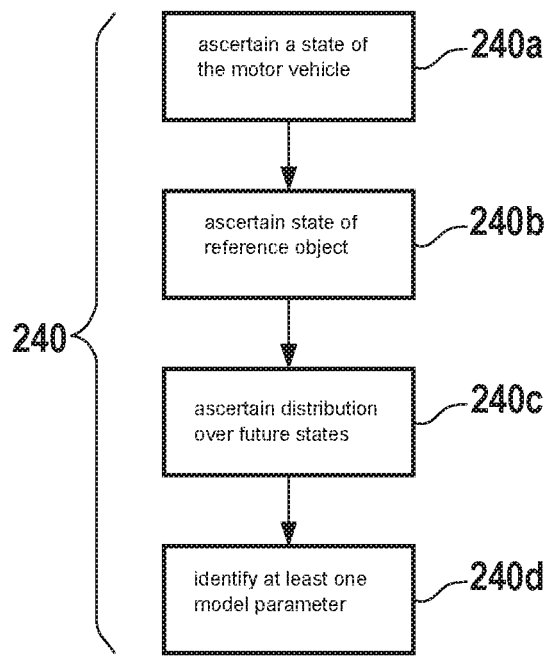
FIG. 3 shows a schematic representation of steps of a second training phase of a computer-implemented method for training a predictive model in accordance with an example embodiment of the present invention.

In one further preferred specific embodiment (FIG. 3) for the present invention, the optimizing (240) of predictive model 120 further includes: ascertaining (240a) a state of the motor vehicle at a time t, including at least one variable, which is associated with the motor vehicle; ascertaining (240b) a state of the reference object at time t, including at least one variable, which is associated with the reference object; and ascertaining (240c) a distribution over future states and identifying (240d) at least one model parameter, which minimizes the expected value of an error in the distribution over the future states. The model parameter characterizes an association between input variables and output variables of predictive model 120.

In this manner, the formation of a prediction error that accumulates in the long term may be advantageously prevented. In particular, an error that accumulates long-term may be formed, if predictive model 120 is not able to reflect the deviation of the driving behavior accurately.

Figure 5:
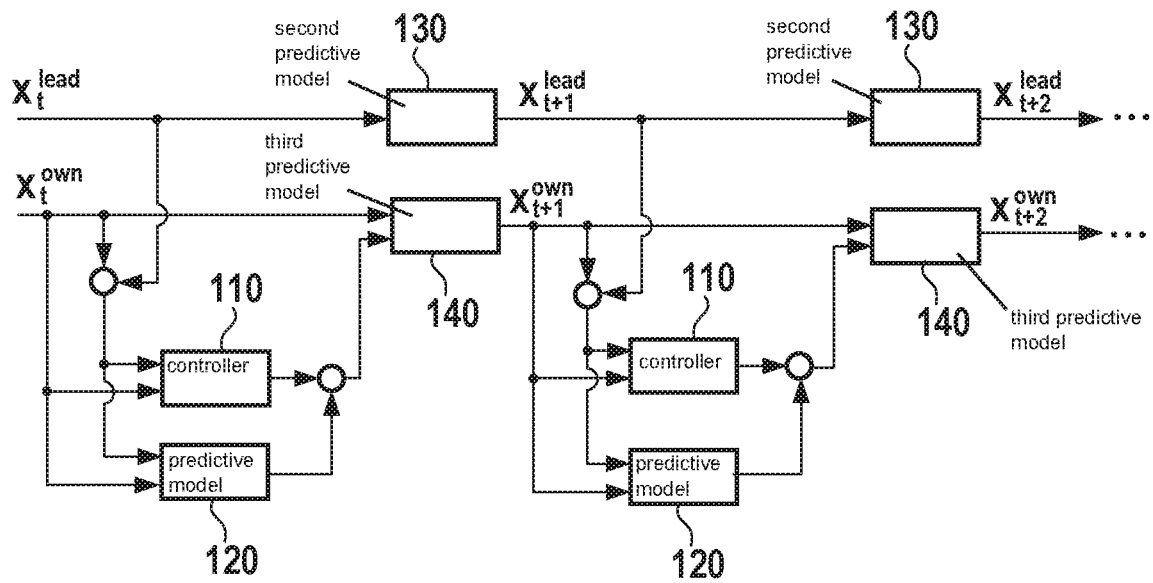
FIG. 5 shows a schematic overall view of the second training phase according to FIG. 3 in accordance with an example embodiment of the present invention.
Figure 6:
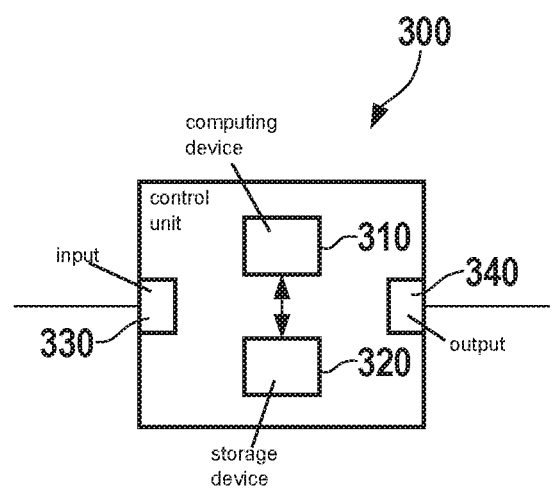
FIG. 6 shows a schematic view of a control unit for a motor vehicle in accordance with an example embodiment of the present invention.

FIG. 5 shows a schematic overall view of the second training phase for optimizing predictive model 120 as a function of at least one further variable, which is associated with a reference object in a surrounding area of the motor vehicle. The variable, which is associated with a reference object in a surrounding area of the motor vehicle, is given by a further, second predictive model 130, which is suitable for predicting a state of the reference object. A further, third predictive model 140 combines controller 110 and predictive model 120 and, thus, is suitable for predicting the state of the motor vehicle.

$x_t^{own}$ represents the state of the motor vehicle at time t. $x_t^{own}$ advantageously includes all of the variables, which are made available to predictive model 120 and controller 110. $x_t^{lead}$ represents the state, in particular, information about the position and/or speed, of the reference object, for example, a third vehicle driving ahead, at time t. The distance from this reference object at time t is also supplied to predictive model 120 and controller 110.

If at least one of the predictive models 120, 130, 140 or controller 110 is a stochastic model, then a distribution over future states may be derived from it; the distribution being given by $$p(x_{t+1}^{own}, x_{t+1}^{lead}, x_{t+2}^{own}, x_{t+2}^{lead}, \ldots | x_t^{own}, x_t^{lead}, \theta).$$

An error in the future states at time t+δ is given by $L(x_{t+\delta}^{own}, x_{t+\delta}^{lead})$. An error measures, for example, a difference from the reference variable and/or an exceedance and/or undershooting of maximum or minimum allowable differences. A model parameter, which minimizes the expected value of the error, solves the following optimization problem $$\theta = \text{argmin}_\theta \mathbb{E} [\Sigma_{\delta=1}^{T_{max}} L(x_{t+\delta}^{own}, x_{t+\delta}^{lead}) | p \\ (x_{t+1}^{own}, x_{t+1}^{lead}, x_{t+2}^{own}, x_{t+2}^{lead}, \ldots | x_t^{own}, x_t^{lead}, \theta)],$$

where $T_{max}$ describes the maximum prediction horizon. The identified model parameter minimizes the accumulated error of time step $T_{max}$. Predictive model 120 is advantageously optimized on this basis.

Figure 4:
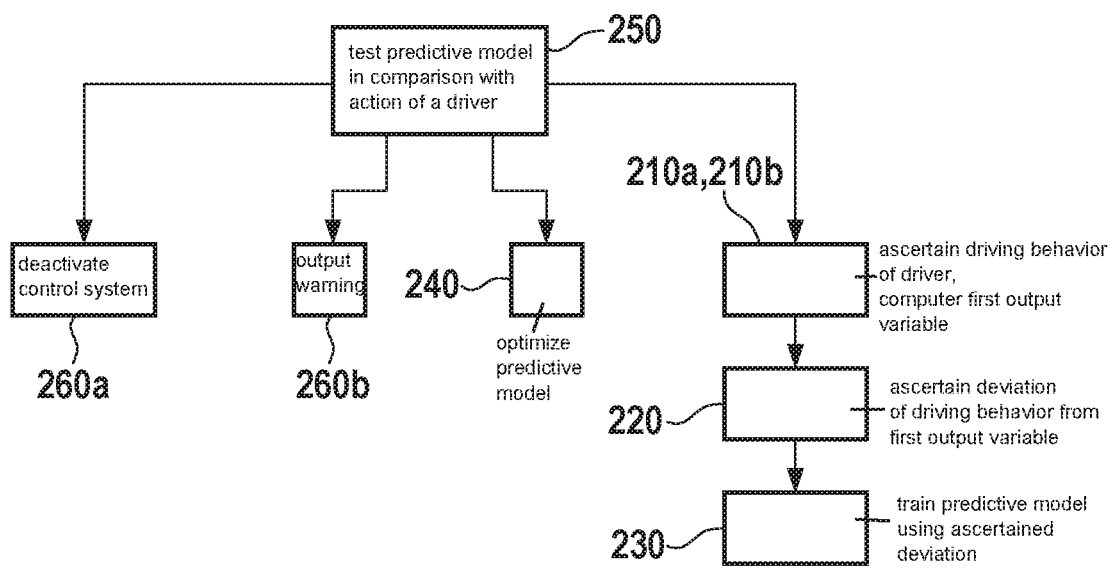
FIG. 4 shows a schematic representation of steps of a third training phase of a computer-implemented method for training a predictive model in accordance with an example embodiment of the present invention.

In one further preferred specific embodiment of the present invention, a third training phase of method 200 includes: in the activated state of the control system, testing 250 the predictive model in comparison with an action of the driver. A schematic depiction of steps of the third training phase of computer-implemented method 200 is shown in FIG. 4.

In one further preferred specific embodiment of the present invention, the first and/or the second training phase are repeated, and/or further steps, in particular, deactivation 260a of control system 100 and/or outputting 260b of a warning, are executed as a function of the testing 250 of predictive model 120.

Further preferred specific embodiments of the present invention relate to a computer program, which is configured to execute the steps of the method 200 according to the specific embodiments.

Further preferred specific embodiments of the present invention relate to a machine-readable storage medium, in which the computer program according to the specific embodiments is stored.

Further preferred specific embodiments of the present invention relate to a control unit 300, which is configured to execute the steps of a method 200 according to the specific embodiments of the present invention. Control unit 300 includes a computing device 310 and at least one storage device 320, in which control system 100 is stored. In addition, control unit 300 includes an input 330 for receiving information about variables of the control system, such as a reference variable and directly controlled variable, and additional variables, which represent the operating data of the motor vehicle and/or surrounding-area data of the motor vehicle. These variables are advantageously measured by suitable sensors, such as surround sensors, and/or provided to the control system by suitable devices for transmitting data. Furthermore, control unit 300 includes an output 340 for controlling actuators of on-board systems of the motor vehicle, in particular, a steering system, brake system, the power train, and warning systems.

Further preferred specific embodiments of the present invention relate to use of a control system 100 according to the specific embodiments, and/or of a predictive model 120 that is trained by a method 200 according to the specific embodiments, and/or of a method according to the specific embodiments, and/or of a computer program according to the specific embodiments, and/or of a machine-readable storage medium according to the specific embodiments, and/or of a control unit 300 according to the specific embodiments, for adapting a control system 100 for a motor vehicle to an individual driving behavior of a driver.

Further preferred specific embodiments of the present invention relate to use of a control system 100 according to the specific embodiments of the present invention, and/or of a predictive model 120 that is trained by a method 200 according to the specific embodiments of the present invention, and/or of a method 200 according to the specific embodiments of the present invention, and/or of a computer program according to the specific embodiments of the present invention, and/or of a machine-readable storage medium according to the specific embodiments of the present invention, and/or of a control unit 300 according to the specific embodiments of the present invention, in a driving assistance system of a motor vehicle, in particular, for adaptive cruise control (ACC).

What is claimed is:

1. A control system for a motor vehicle in which an actual state of the motor vehicle with respect to a predefined parameter is adapted towards a target state of the motor vehicle with respect to the predefined parameter using a controlling variable that adjusts one or more operations of the motor vehicle, the control system comprising:
   a processor configured to execute a controller algorithm and to apply a predictive model;
   wherein:
      the execution of the controller algorithm causes the processor to output a first output variable based on the actual state and target state, the first output variable being usable to perform the adjustment, as an iterative feedback control for adapting the actual state to be changed towards the target state;
      the predictive model is trained to cause the processor, by the application of the predictive model, to output a second output variable, the second output variable being a value that represents a deviation of a driving behavior of a driver of the motor vehicle from controls reflected by the first output variable of the controller algorithm;
      the processor is configured to:
         add (a) the first output variable, which is usable for the iterative feedback control to adapt the actual state to be changed towards the target state with a behavior that is not modified towards the driving behavior of the driver and the second output variable, which is the value that represents the driving behavior of the driver, to obtain a sum of the addition as the controlling variable; and
         perform the iterative feedback control, with a modification towards the driving behavior of the driver, by outputting the controlling variable to control the operations, by which the actual state is adapted towards the target state.

2. The control system as recited in claim 1, wherein the predefined parameter is a distance of the motor vehicle from a reference object in a surrounding area of the motor vehicle.

3. The control system as recited in claim 1, wherein the controller algorithm is a PID algorithm.

4. The control system as recited in claim 1, wherein the predictive model is trained to cause the processor, by the application of the predictive model, to output the second output variable as a function of input of: the target state, and/or the actual state, and/or a variable that represents operating data of the motor vehicle, and/or surrounding-area data of the motor vehicle.

5. A computer-implemented method for training a user-behavior predictive model for a control system for a motor vehicle, the control system including a processor configured to execute a controller algorithm and apply the user-behavior predictive model to output a controlling variable, using which an actual state of the motor vehicle with respect to a predefined parameter is adaptable towards a target state of the motor vehicle with respect to the predefined parameter, the controlling variable adjusting one or more operations of the motor vehicle, the method comprising the following steps:
   performing a first training phase including:
      in a deactivated state of the control system, ascertaining a deviation of a driving behavior of a driver of the motor vehicle from a first output variable that the controller algorithm outputs based on the actual state and the target state, the first output variable defining a first adjustment of the one or more operations of the motor vehicle, as an iterative feedback control for adapting the actual state to be changed towards the target state; and
      training the user-behavior predictive model using the ascertained deviation of the driving behavior to output a second output variable, the second output variable being a value that represents the deviation of the driving behavior of the driver of the motor vehicle from controls reflected by the first output variable of the controller algorithm, wherein and (b) by an addition of (a) the first output variable, which is usable for the iterative feedback control to adapt the actual state to be changed towards the target state with a behavior that is not modified towards the driving behavior of the driver, and (b) the second output variable, which is the value that represents the driving behavior of the driver, produces a sum from which as the controlling variable is obtained by which the iterative feedback control is performable, with a modification towards the driving behavior, by outputting the controlling variable to control the operations, by which the actual state is adapted towards the target state; and
   performing a second training phase that includes optimizing the user-behavior predictive model by modifying at least one parameter of the user-behavior predictive model in an error minimization process directed to minimization of a predefined error, wherein the predefined error is a cumulative error resulting from value predictions recursively over a plurality of prediction iterations through a predefined prediction horizon, each of the iterations corresponding to a respective one of a plurality of points in time, wherein, after a first of the iterations, each respective one of the iterations uses output of an immediately preceding one of the iterations, and wherein the value predictions are obtained by at least application, in each of the iterations, of at least one predictive model, the at least one predictive model including the user-behavior predictive model.

6. The method as recited in claim 5, wherein the first training phase further includes:
ascertaining the driving behavior of the driver as a function of the actual state of the motor vehicle, and computing the first output variable of the controller.

7. The method as recited in claim 6, wherein the ascertaining of the driving behavior includes ascertaining at least one variable which represents: an accelerator pedal action and/or a braking action and/or a steering action.

8. The method as recited in claim 5, wherein the training takes place as a function of at least one further variable, which represents operating data of the motor vehicle and/or surrounding-area data of the motor vehicle.

9. The method as recited in claim 5, wherein the second training phase further includes optimizing the user-behavior predictive model as a function of at least one further variable, which is associated with a reference object in a surrounding area of the motor vehicle.

10. The method as recited in claim 5, wherein the at least one predictive model further includes:
a vehicle-operation predictive model that ascertains at least one variable of a state of the motor vehicle; and
an object predictive model that ascertains at least one variable of a state of a reference object in a surrounding are of the motor vehicle.

11. The method as recited in claim 5, the method further comprising:
a third training phase including, in an activated state of the control system, testing the user-behavior predictive model in comparison with an action of the driver.

12. The method as recited in claim 11, wherein, as a function of the testing of the user-behavior predictive model:
(i) the first and/or the second training phase are repeated; and/or
(ii) further steps including deactivating the control system and/or outputting a warning are executed.

13. A non-transitory machine-readable storage medium on which is stored a computer program for training a user-behavior predictive model for a control system for a motor vehicle, the control system including a processor configured to execute a controller algorithm and apply the user-behavior predictive model to output a controlling variable, using which an actual state of the motor vehicle with respect to a predefined parameter is adaptable towards a target state of the motor vehicle with respect to the predefined parameter, the controlling variable adjusting one or more operations of the motor vehicle, the computer program, when executed by the processor, causing the processor to perform the following steps:
performing a first training phase including:
in a deactivated state of the control system, ascertaining a deviation of a driving behavior of a driver of the motor vehicle from a first output variable that the controller algorithm outputs based on the actual state and the target state, the first output variable defining a first adjustment of the one or more operations of the motor vehicle, as an iterative feedback control for adapting by which the actual state to be changed is adaptable towards the target state; and training the user-behavior predictive model using the ascertained deviation of the driving behavior to output a second output variable, the second output variable being a value that represents the deviation of the driving behavior of the driver of the motor vehicle from controls reflected by the first output variable of the controller algorithm, wherein an addition of (a) the first output variable, which is usable for the iterative feedback control to adapt the actual state to be changed towards the target state with a behavior that is not modified towards the driving behavior of the driver, and (b) the second output variable, which is the value that represents the driving behavior of the driver, produces a sum as the controlling variable by which the iterative feedback control is performable, with a modification towards the driving behavior, by outputting the controlling variable to control the operations, by which the actual state is adapted towards the target state; and
performing a second training phase that includes optimizing the user-behavior predictive model by modifying at least one parameter of the user-behavior predictive model in an error minimization process directed to minimization of a predefined error, wherein the predefined error is a cumulative error resulting from value predictions recursively over a plurality of prediction iterations through a predefined prediction horizon, each of the iterations corresponding to a respective one of a plurality of points in time, wherein, after a first of the iterations, each respective one of the iterations uses output of an immediately preceding one of the iterations, and wherein the value predictions are obtained by at least application, in each of the iterations, of at least one predictive model, the at least one predictive model including the user-behavior predictive model.

14. A control unit configured to train a user-behavior predictive model of a control system for a motor vehicle, the control system configured to execute a controller algorithm and apply the user-behavior predictive model to output a controlling variable, using which an actual state of the motor vehicle with respect to a predefined parameter is adaptable towards a target state of the motor vehicle with respect to the predefined parameter, the controlling variable adjusting one or more operations of the motor vehicle, the control unit comprising:
a processor, wherein the processor is configured to:
perform a first training phase that includes:
in a deactivated state of the control system, ascertaining a deviation of a driving behavior of a driver of the motor vehicle from a first output variable that the controller algorithm outputs based on the actual state and the target state, the first output variable defining a first adjustment of the one or more operations of the motor vehicle, as an iterative feedback control for adapting the actual state to be changed towards the target state; and
training the user-behavior predictive model using the ascertained deviation of the driving behavior to output a second output variable, the second output variable being a value that represents the deviation of the driving behavior of the driver of the motor vehicle from controls reflected by the first output variable of the controller algorithm, wherein by an addition of (a) the first output variable, which is usable for the iterative feedback control to adapt the actual state to be changed towards the target state with a behavior that is not modified towards the driving behavior of the driver, and (b) the second output variable, which is the value that represents the driving behavior of the driver, produces a sum as the controlling variable is by which the iterative feedback control is performable, with a modification towards the driving behavior, by outputting the controlling variable to control the operations, by which the actual state is adapted towards the target state; and perform a second training phase that includes optimizing the user-behavior predictive model by modifying at least one parameter of the user-behavior predictive model in an error minimization process directed to minimization of a predefined error, wherein the predefined error is a cumulative error resulting from value predictions recursively over a plurality of prediction iterations through a predefined prediction horizon, each of the iterations corresponding to a respective one of a plurality of points in time, wherein, after a first of the iterations, each respective one of the iterations uses output of an immediately preceding one of the iterations, and wherein the value predictions are obtained by at least application, in each of the iterations, of at least one predictive model, the at least one predictive model including the user-behavior predictive model.

15. The control system as recited in claim 1, wherein the output of the controlling variable using the application of the predictive model modifies a way in which the actual state is adapted towards the target state by modifying a control of an operation of the motor vehicle performed for the adaptation so that the operation has a behavior that is more similar to the driving behavior of the driver than without the modification.

16. The control system as recited in claim 1, wherein the output of the controlling variable affects operation of a driving assistance system of the motor vehicle for adaptive cruise control (ACC).

17. The control system as recited in claim 1, wherein the predictive model is a Gaussian process model.

18. The control system as recited in claim 1, wherein the predictive model is a neural network algorithm.

19. The control system as recited in claim 1, wherein the sum of the addition is used as the controlling variable.

20. The control system as recited in claim 2, wherein the one or more operations includes at least one of a steering, a braking, and a power train control.

21. The method as recited in claim 5, wherein the minimization of the predefined error is with respect to a prediction of a combined future state of the motor vehicle and of an object external to the motor vehicle.

22. The method as recited in claim 5, the method further comprising:

a third training phase including, in an activated state of the control system, testing the user-behavior predictive model in comparison with an action of the driver, wherein, during the activated state:
the controller algorithm is executed to output the first output variable based on the actual state and the target state;
the predictive model is applied to output the second output variable that reflects the deviation of the driving behavior of the driver of the motor vehicle from the output variable;
the second output variable is added to the first output variable to obtain the controlling variable; and
the controlling variable is used to control the operations of the motor vehicle to adapt the actual state towards the target state.

\* \* \* \* \*